3,463,784
THIAZOLIDINE DERIVATIVE AND
PROCESS THEREFOR
Peter Doyle, Geoffrey Swain, and Alastair Graham Wylie, Macclesfield, England, assignors to Imperial Chemical Industries Limited, London, England, a corporation of Great Britain
No Drawing. Filed Nov. 10, 1966, Ser. No. 593,281
Claims priority, application Great Britain, Dec. 10, 1965, 53,525/65; Mar. 10, 1966, 10,545/66
Int. Cl. C07d 91/18; A61k 27/00
U.S. Cl. 260—306.7
2 Claims

ABSTRACT OF THE DISCLOSURE

The preparation of the salt of p-toluene-sulphonic acid with 2-imino-3-(2-hydroxy-2-phenylethyl) thiazolidine is described by reacting thiourea or thiocyanic acid with N-(2-bromoethyl)-N-(2-hydroxy-2-phenylethyl) ammonium bromide, or an analogue, under reflux in a lower alkanol.

---

This invention relates to a process for the manufacture of compounds which are useful as intermediates in the manufacture of other compounds which are themselves useful as anthelmintic agents.

According to the invention we provide a process for the manufacture of thiazolidine derivatives of the formula:

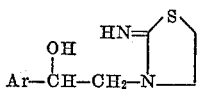

wherein Ar stands for a thienyl, furyl, naphthyl or benzyl radical, or a phenyl radical optionally substituted with one or more halogen atoms or nitro, amino or trifluoromethyl radicals, and the salts thereof, which comprises the interaction of thiourea or thiocyanic acid with an ammonium salt of the formula:

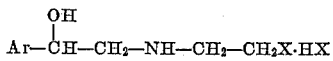

wherein Ar has the meaning stated above and X stands for a halogen atom or a radical of the formula —O.SO$_2$.R wherein R stands for an aryl radical optionally substituted, whereafter, if desired, the product is converted into a salt thereof.

As a suitable value for X there may be mentioned, for example, a bromine or chlorine atom or a radical of the formula —O.SO$_2$.R wherein R stands for a phenyl or naphthyl radical, optionally substituted with an alkyl radical of not more than 2 carbon atoms, for example the p-tolyl radical.

The interaction may be carried out in a diluent or solvent, for example isopropanol or n-butanol, and it may be accelerated or completed by the application of heat. The thiocyanic acid may be produced in situ by the addition of a thiocyanate, for example an alkali metal thiocyanate, for example potassium thiocyanate, to an acidic reaction medium, for example a medium in which the ammonium salt reactant has been generated in situ as described hereinafter and in which there is an excess of the acid of the formula HX, wherein X has the meaning stated above.

As suitable thiazolidinium salts which may be obtained as products of a process of this invention there may be mentioned acid-addition salts with inorganic acids or organic acids. Salts with aromatic sulphonic acids are new compounds and they are preferred salts in that, as described in our co-pending U.S. application Ser. No. 593,313, they are particularly useful as intermediates in the manufacture of anthelmintic agents. According to a further feature of this invention we provide acid-addition salts of thiazolidine derivatives of the formula:

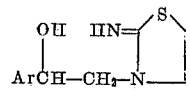

wherein Ar has the meaning stated above, with aromatic sulphonic acids.

As a suitable aromatic sulphonic acid there may be mentioned, for example, an arenesulphonic acid optionally substituted, for example benzenesulphonic acid or naphthalenesulphonic acid, either of which may optionally be substituted with an alkyl radical of not more than 2 carbon atoms, for example p-toluenesulphonic acid.

As a specific thiazolidine acid-addition salt of this invention there may be mentioned, for example, 2-imino-3-(2-hydroxy-2-phenylethyl)thiazolidinium p-toluenesulphonate.

The ammonium salts of the formula:

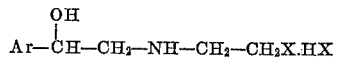

wherein Ar and X have the meanings stated above, which are used as starting materials as described above, are new compounds, and we provide these compounds as another feature of this invention.

As specific ammonium salts of this invention there may be mentioned, for example, N-(2-bromoethyl)-N-(2-hydroxy-2-phenylethyl)ammonium bromide and N-(2-p-toluenesulphonyloxyethyl)-N-(2-hydroxy-2-phenylethyl-ammonium p-toluenesulphonate.

According to yet a further feature of this invention we provide a process for the manufacture of the ammonium salts of the invention, which comprises the interaction of an ethyleneimine derivative of the formula:

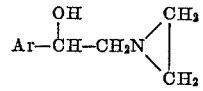

wherein Ar has the meaning stated above, with a compound of the formula HX wherein X has the meaning stated above.

The last-named process may be carried out in a diluent or solvent, for example isopropanol or n-butanol, and it may either be carried out at ambient temperature or accelerated or completed by the application of heat.

The ammonium salts may be generated in situ by the last-named process and then, without being isolated, they may be converted into the thiazolidine derivatives of the invention by the first process described above.

The thiazolidine derivatives of this invention are useful in that they may be converted by cyclisation into compounds, for example dl-2,3,5,6-tetrahydro-6-phenylimidazo[2,1-b]thiazole, having anthelmintic properties.

The invention is illustrated but not limited by the following examples in which the parts are by weight:

Example 1

A solution of 2.77 parts of N-(2-bromoethyl)-N-(2-hydroxy-2-phenylethyl)ammonium bromide and 0.65 part of thiourea in 20 parts of n-butanol is refluxed during 6 hours. The solution is then cooled and stirred, and 1.47 parts of p-toluenesulphonic acid are added. The resulting mixture is filtered, and the solid residue is washed with 10 parts of acetone and then dried. There is thus obtained 2-imino-3-(2-hydroxy-2-phenylethyl)thiazolidinium p-toluenesulphonate, M.P. 242–244° C., $\lambda_{max.}$ 3350, 3060, 1680 and 1635 cm.$^{-1}$.

The N-(2-bromoethyl)-N-(2-hydroxy-2-phenylethyl) ammonium bromide used as starting material may be obtained as follows:

1.63 parts of N-(2-hydroxy-2-phenylethyl)aziridine are added to 4.5 parts of 48–50% w./v. hydrobromic acid at such a rate as to maintain the temperature of the mixture below 40° C. 1 hour after the end of the above addition, 10.5 parts of 48–50% w./v. hydrobromic acid are added to the mixture. The mixture is stirred until precipitation is complete, and the resulting mixture is filtered. The solid residue is washed with 8 parts of acetone and then dried. There is thus obtained N-(2-bromoethyl)-N-(2-hydroxy-2-phenylethyl)ammonium bromide, M.P. 148–150° C., $\lambda_{max}$. 3130, 3050 and 1560 cm.$^{-1}$.

Example 2

A solution of 6.52 parts of N-(2-hydroxy-2-phenylethyl)aziridine in 30 parts of n-butanol is added during 15 minutes to a stirred solution of 15.6 parts of p-toluenesulphonic acid monohydrate in 30 parts of n-butanol. When the addition is complete, 3.04 parts of thiourea are added to the resulting solution containing N-(2-p-toluenesulphonyloxyethyl)-N-(2-hydroxy-2-phenylethyl) ammonium p-toluenesulphonate, and the mixture is refluxed for 24 hours. The reaction mixture is then cooled and filtered, and the solid residue is washed with 30 parts of isopropanol. The solid is then stirred together with 40 parts of water during 15 minutes, and the mixture is then filtered. The solid residue is 2-imino-3-(2-hydroxy-2-phenylethyl)thiazolidinium p-toluenesulphonate, M.P. 242–244° C.

Example 3

A solution of 1.63 parts of N-(2-hydroxy-2-phenylethyl)aziridine in 8 parts of isopropanol is added during 15 minutes to a solution of 3.9 parts of p-toluenesulphonic acid monohydrate in 15 parts of isopropanol. The resulting solution is heated under reflux for 30 minutes. 0.97 part of potassium thiocyanate is then added to the resulting solution containing N-(2-p-toluenesulphonyloxyethyl)-N-(2-hydroxy-2-phenylethyl)ammonium p-toluenesulphonate, and the mixture is refluxed for 24 hours. The reaction mixture is then cooled and filtered, and the solid residue is washed with 8 parts of water. The residual solid is 2-imino-3-(2-hydroxy-2-phenylethyl)thiazolidinium p-tolenesulphonate, M.P. 242–244° C.

What we claim is:
1. The salt of p-toluenesulphonic acid with 2-imino-3-(2-hydroxy-2-phenylethyl) thiazolidine.
2. A process for the preparation of the salt of p-toluenesulphonic acid with 2-imido-3-(2-hydroxy-2-phenylethyl) thiazolidine, which comprises reacting a compound selected from the group consisting of thiourea and thiocyanic acid with an ammonium salt of the formula:

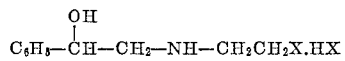

wherein X is selected from the group consisting of bromine, chlorine and p-toluenesulphonyloxy, in a solvent selected from the group consisting of n-butanol and isopropanol, and substantially under reflux, and, in the case where X is selected from the group consisting of bromine and chlorine, reacting the product with p-toluenesulphonic acid.

References Cited
UNITED STATES PATENTS 3,264,316  8/1966  Van De Westeringh et al.
                              260—306.7
3,297,708  1/1967  Garber et al. _____ 260—306.7

U.S. Cl. X.R.

ALEX MAZEL, Primary Examiner

R. J. GALLAGHER, Assistant Examiner

U.S. Cl. X.R.

260—332.3, 347.7, 456, 570.6, 999